(12) United States Patent
Yamamoto et al.

(10) Patent No.: US 6,481,550 B2
(45) Date of Patent: Nov. 19, 2002

(54) MOTOR HAVING CLUTCH PROVIDED WITH STOPPER

(75) Inventors: Hiroaki Yamamoto, Kosai (JP);
Hirofumi Sakai, Hamana-gun (JP);
Kengo Yamamura, Inasa-gun (JP);
Katsuhiko Torii, Hamamatsu (JP);
Tadashi Adachi, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/904,899

(22) Filed: Jul. 16, 2001

(65) Prior Publication Data

US 2002/0011390 A1 Jan. 31, 2002

(30) Foreign Application Priority Data

Jul. 25, 2000 (JP) ........................................ 2000-224045
Jul. 28, 2000 (JP) ........................................ 2000-228842

(51) Int. Cl.$^7$ .............................................. H02K 7/108
(52) U.S. Cl. .......................................... 192/44; 310/78
(58) Field of Search .............................. 192/38, 42, 44; 310/75 R, 78

(56) References Cited

U.S. PATENT DOCUMENTS

| | | | | |
|---|---|---|---|---|
| 5,899,294 A | * | 5/1999 | Shimizu et al. ............. | 180/443 |
| 6,229,233 B1 | * | 5/2001 | Torii et al. ..................... | 192/44 |
| 6,288,464 B1 | * | 9/2001 | Torii et al. ................ | 192/223.2 |
| 6,390,264 B2 | * | 5/2002 | Torii et al. ................ | 192/223.2 |

* cited by examiner

*Primary Examiner*—Saul Rodriguez
(74) *Attorney, Agent, or Firm*—Law Offices of David G. Posz

(57) ABSTRACT

A clutch includes a stopper secured to a gear housing of a motor. Once the stopper is secured to the gear housing, the stopper restrains axial movement of rolling elements by restraining axial movement of a support member, which rotatably supports the rolling elements, to retain the rolling elements within a collar. A driven-side rotator of the clutch includes reinforcing ribs for reinforcing engaging projections of the driven-side rotator.

17 Claims, 11 Drawing Sheets

MOTOR HAVING CLUTCH PROVIDED WITH STOPPER

CROSS REFERENCE RELATED APPLICATION

This application is based on and incorporates herein by reference Japanese Patent Application No. 2000-224045 filed on Jul. 25, 2000 and Japanese Patent Application No. 2000-228842 filed on Jul. 28, 2000.

BACKGROUND OF THE INVENTION

1. Field of the Invention

The present invention relates to a motor having a clutch.

2. Description of Related Art

FIGS. 9 to 11 show one previously proposed motor used, for example, in a power window system. As shown in FIG. 9, the motor includes an oblate motor main body 82, an oblate output unit 84 and a clutch 85 (FIGS. 10 and 11). The motor main body 82 includes a rotatable shaft 81. The output unit 84 includes a worm shaft 83. The clutch 85 transmits rotation of the rotatable shaft 81 to the worm shaft 83 but prevents transmission of rotation of the worm shaft 83 to the rotatable shaft 81.

As shown in FIG. 10, the clutch 85 includes a driving-side rotator 86, a driven-side rotator 87, a collar 89 and rolling elements 90. The driving-side rotator 86 is secured to a distal end of the rotatable shaft 81. The driven-side rotator 87 is secured to a base end of the worm shaft 83. The collar 89 is secured to a gear housing 88 of the output unit 84 to surround both the driving-side rotator 86 and the driven-side rotator 87. The rolling elements 90 are arranged between the driven-side rotator 87 and the collar 89.

An annular recess 86a having diametrically opposing flat inner surfaces is formed in the axial center of the driving-side rotator 86. An annular protrusion 81a having diametrically opposing flat outer surfaces formed in the distal end of the rotatable shaft 81 is fitted within the annular recess 86a, so that the rotatable shaft 81 is connected to the driving-side rotator 86 to rotate integrally with the driving-side rotor 86.

On a worm shaft 83 side of the driving-side rotator 86, protrusions 86b are arranged at predetermined angular positions at radially outward region of the driving-side rotator 86. Each protrusion 86b extends outwardly in a radial direction and also extends toward the worm shaft 83 side in an axial direction. A plurality of recesses 87a are formed at predetermined angular positions at a radially outward region of the driven-side rotator 87. A radially inward portion (where a rubber component G is arranged) of each protrusion 86b is received within the corresponding recess 87a of the driven-side rotator 87 in such a manner that a predetermined circumferential space is provided between each protrusion 86b and the corresponding recess 87a. Control surfaces 87b are provided in radially outer surfaces of protruded portions of the driven-side rotator 87 that are formed between the recesses 87a. A radial space between an inner peripheral surface of a cylindrical portion 89a of the collar 89 and each control surface 87b varies in a circumferential direction. Each rolling element 90 is arranged between the corresponding control surface 87b and the cylindrical portion 89a.

An annular disk portion 89b that extends radially inwardly is formed at one end (upper end in FIG. 10) of the cylindrical portion 89a of the collar 89. An annular cover plate 91 is fitted within the other end (lower end in FIG. 10) of the cylindrical portion 89a. The cover plate 91 and the annular disk portion 89b limit axial movement of the driving-side rotator 86, the driven-side rotator 87 and the rolling elements 90. That is, in order to hold the protrusions 86b of the driving-side rotator 86 and the rolling elements 90 within the collar 89, an inner diameter of a central opening of the disk portion 89b is selected in such a manner that the disk portion 89b prevents the protrusions 86b and the rolling elements 90 to pass through the central opening of the disk portion 89b. The other end of the cylindrical portion 89a (lower end in FIG. 10) is securely fitted within a serrated annular groove 88a formed in the gear housing 88.

In the motor having the above structure, the driven-side rotator 87, to which the driving-side rotator 86, the rolling elements 90 and the worm shaft 83 are mounted, is received within the collar 89. Then, the cover plate 91 is fitted within the collar 89 to hold the driving-side rotator 86, the rolling elements 90 and the driven-side rotator 87 within the collar 89. Next, the worm shaft 83 is received within a worm-shaft receiving recess 88b of the gear housing 88.

Thereafter, a yoke 92 of the motor main body 82 is connected to the gear housing 88 of the output unit 84, and the protrusion 81a is fitted within the recess 86a to secure the rotatable shaft 81 to the driving-side rotator 86.

In the clutch 85, when the motor main body 82 is driven to rotate the rotatable shaft 81 and thereby the driving-side rotator 86, each rolling element 90 is pushed by a radially outward portion of the corresponding protrusion 86b, and a wall surface of each recess 87a of the driven-side rotator 87 is pushed by a radially inward portion of the corresponding protrusion 86b. As a result, the driving-side rotator 87 and the worm shaft 83 are rotated together.

On the other hand, in a non-actuated state of the motor main body 82, if the driven-side rotator 87 is forcefully rotated along with the worm shaft 83, each rolling element 90 is soon clamped between the corresponding control surface 87b and the inner peripheral surface of the collar 89 to prevent further rotation of the driven-side rotator 87 (locked state), as shown in FIG. 11.

When each rolling element 90 is clamped between the corresponding control surface 87b and the inner peripheral surface of the collar 89 (locked state), a pressure is applied to the circumferential end of the corresponding control surface 87b from the rolling element 90 in a generally radially inward direction (direction of arrow B in FIG. 11). When rapid rotation of the driven-side rotator 87 is abruptly locked, the circumferential end of the engaging projection 87c where the rolling element is located can be deformed or damaged. Furthermore, after the driven-side rotator 87 is locked multiple times, the circumferential end of the engaging projection 87c can be also deformed or damaged, disadvantageously decreasing durability of the clutch.

During assembly of the above-described motor, each component 86, 87, 90, 91 of the clutch 85 is first installed on the collar 89. Then, the assembled clutch 85 is installed in the gear housing 88. Thus, the base component, on which the other components are installed, is switched from one component (collar 89) to the other component (gear housing 88), resulting in a change in an installing direction of the components. This causes a tedious and time consuming assembling work.

To avoid this, it is desirable to sequentially assemble each component of the clutch 85 on the gear housing 88 that acts as the base component. However, once the driven-side rotator 87, the rolling elements 90 and the collar 89 are installed in the gear housing 88, the driving-side rotator 86 cannot be installed within the collar 89. This is due to the fact that the disk portion 89b of the collar 89 prevents the installation of the driving-side rotator 86 within the collar 89.

SUMMARY OF THE INVENTION

The present invention addresses the above disadvantages. Thus, it is an objective of the present invention to provide a motor provided with a clutch having a structure that allows sequential assembly of the clutch on a gear housing of the motor and is capable of retaining each rolling element within a collar of the clutch upon completion of the assembly. It is another objective of the present invention to provide a motor having a clutch that can restrain deformation or damage of a driven-side rotator thereof.

To achieve the objectives of the present invention, there is provided a motor having an oblate motor main body, an output unit and a clutch. The motor main body has a rotatable shaft. The output unit has a housing and a worm shaft. The housing is secured to the motor main body. The worm shaft is supported within the housing. The clutch is arranged between the rotatable shaft and the worm shaft. The clutch transmits rotation of the rotatable shaft to the worm shaft and prevents transmission of rotation of the worm shaft to the rotatable shaft. The clutch includes a driving-side rotator, a generally cylindrical collar, a driven-side rotator, at least one rolling element, a support member and a stopper. The driving-side rotator is arranged to rotate integrally with the rotatable shaft. The collar is secured to the housing. The driven-side rotator is arranged to rotate integrally with the worm shaft. The driven-side rotator is located within the collar in a coaxial manner with respect to the driving-side rotator and has at least one control surface. Each of the at least one control surface is spaced from the collar for a distance that varies in a circumferential direction of the collar. The driven-side rotator is drivingly engageable with the driving-side rotator in a rotational direction. Each of the at least one rolling element is arranged between the collar and a corresponding one of the at least one control surface. Each of the at least one rolling element is rotated together with the driven-side rotator when the driving-side rotator is rotated. Each of the at least one rolling element is clamped between the collar and the corresponding one of the at least one control surface to restrain rotation of the driven-side rotator when the driven-side rotator is rotated. The support member rotatably supports the at least one rolling element. The stopper is secured to the housing. The stopper restrains axial movement of the at least one rolling element by restraining axial movement of the support member to retain the at least one rolling element within the collar.

The driving-side rotator may include at least one protrusion. Each of the at least one protrusion is arranged at a predetermined angular position within the collar and extends in an axial direction of the clutch. The driven-side rotator may include a shaft portion, at least one engaging projection and at least one reinforcing rib. The shaft portion is arranged within the collar and is coaxial with the driving-side rotator. Each of the at least one engaging projection is circumferentially engageable with at least one of the at least one protrusion. Each of the at least one engaging projection extending radially outwardly from the shaft portion and has a corresponding one of the at least one control surface at radially outer end surface thereof. The at least one reinforcing rib reinforces the at least one engaging projection.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
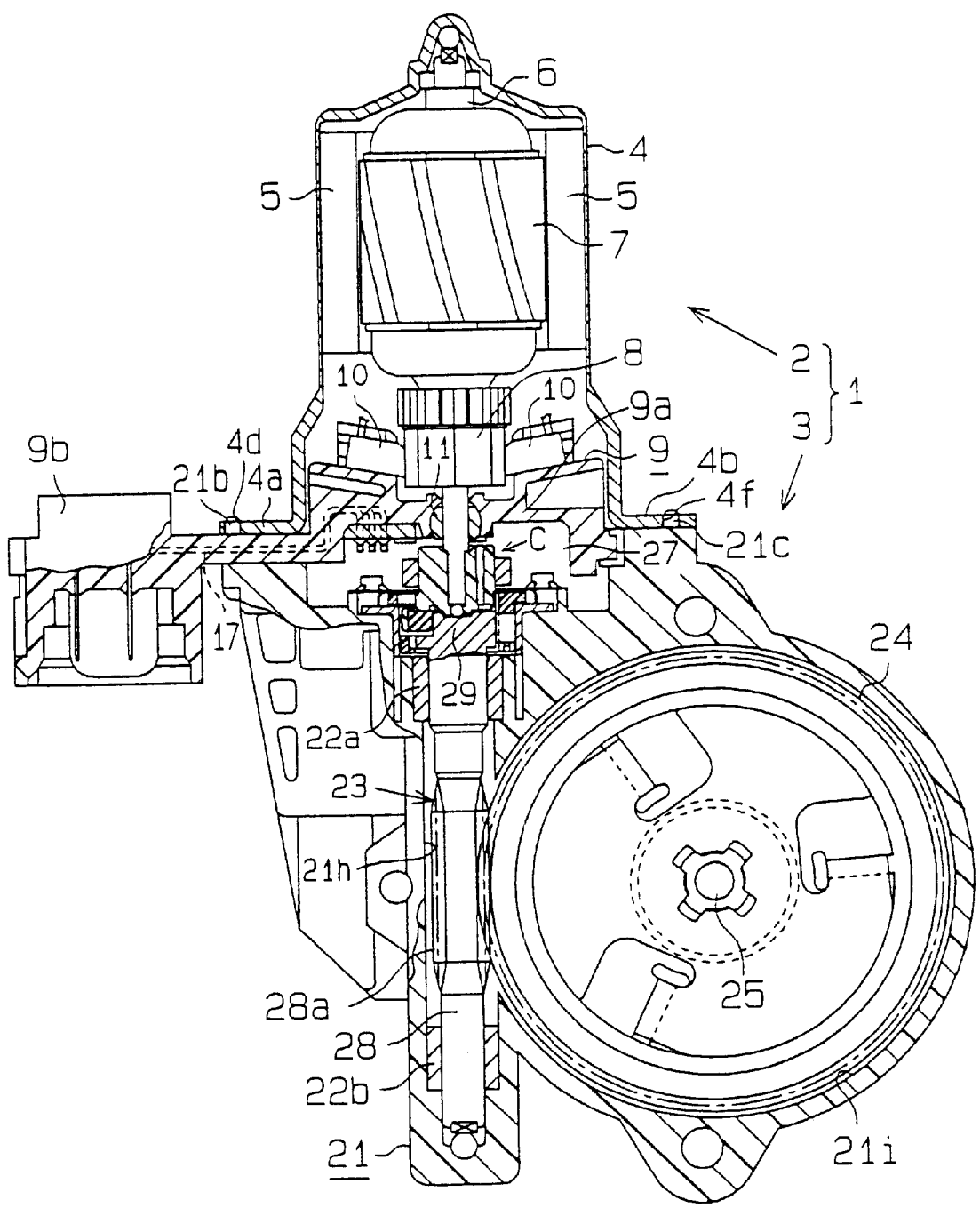
FIG. 1 is a schematic longitudinal cross-sectional view of a motor according to an embodiment of the present invention.
Figure 2:
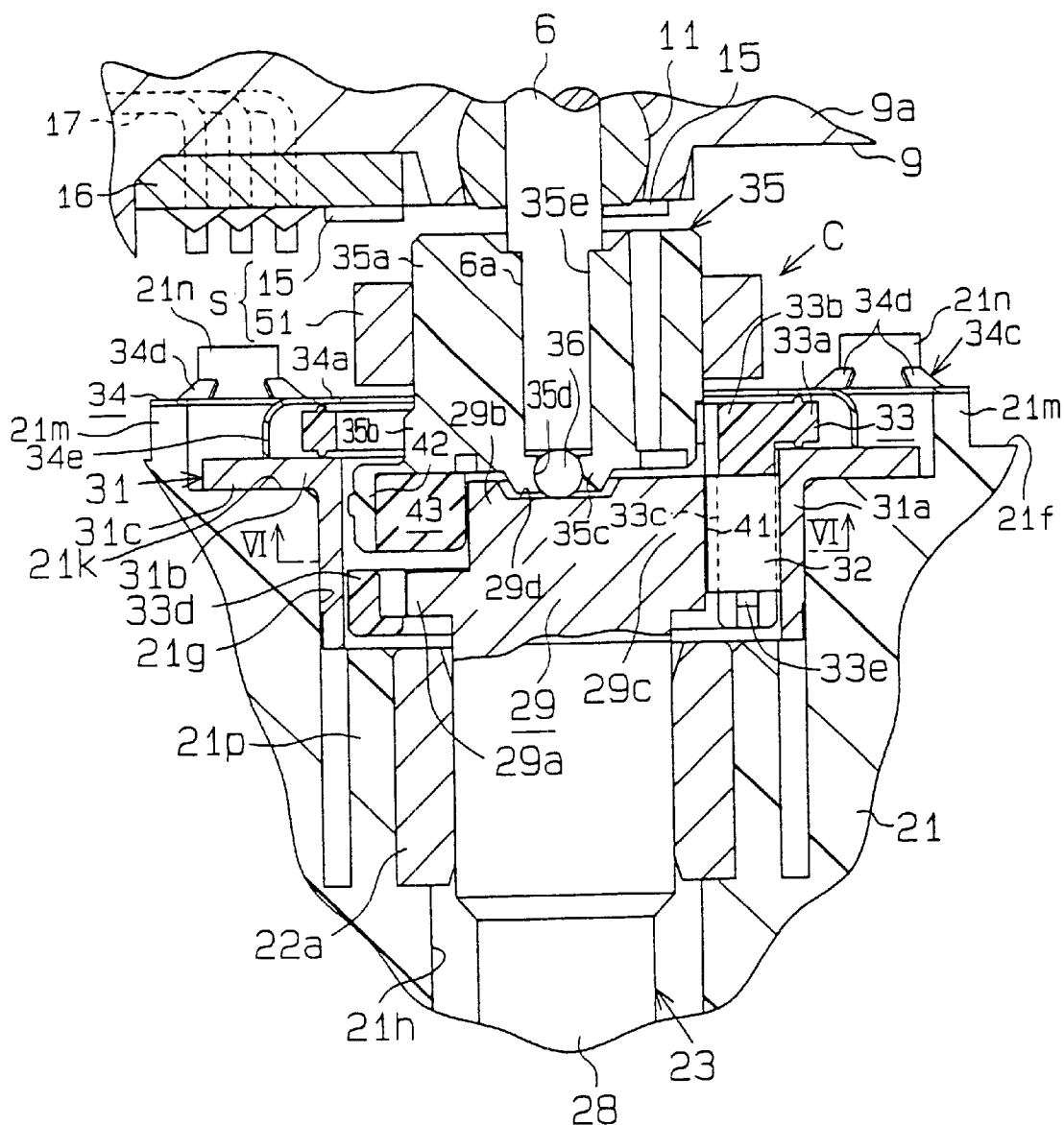
FIG. 2 is a schematic enlarged partial longitudinal cross-sectional view of the motor according to the embodiment.

A motor of a power window system according to one embodiment of the present invention will be described with reference to FIGS. 1–8. FIG. 1 is a cross-sectional view of the motor 1 according to the embodiment. The motor 1 includes an oblate motor main body 2, an output unit 3 and a clutch C (FIG. 2).

As shown in FIG. 1, the motor main body 2 includes a yoke housing (hereinafter simply referred as the yoke) 4, a pair of magnets 5, a rotatable shaft 6, an armature 7, a commutator 8, a resin brush holder 9 and power supplying brushes 10.

The yoke 4 is formed into a generally oblate cylindrical shape having a base at one end (upper end in FIG. 1) and an open end at the other end (lower end in FIG. 1). The two magnets 5 are secured to an inner peripheral surface of the yoke 4 at longitudinal ends of the oblate lateral cross-section of the yoke 4, respectively. A base end of the rotatable shaft 6 is rotatably supported at the base of the yoke 4 along a central axis of the yoke 4. As shown in FIG. 2, an annular protrusion 6a having diametrically opposing flat outer surfaces is formed at a distal end of the rotatable shaft 6.

The armature 7 is secured to a middle part of the rotatable shaft 6 to oppose the magnets 5. The commutator 8 is secured to the rotatable shaft 6 at a position distal to the armature 7.

Figure 3:
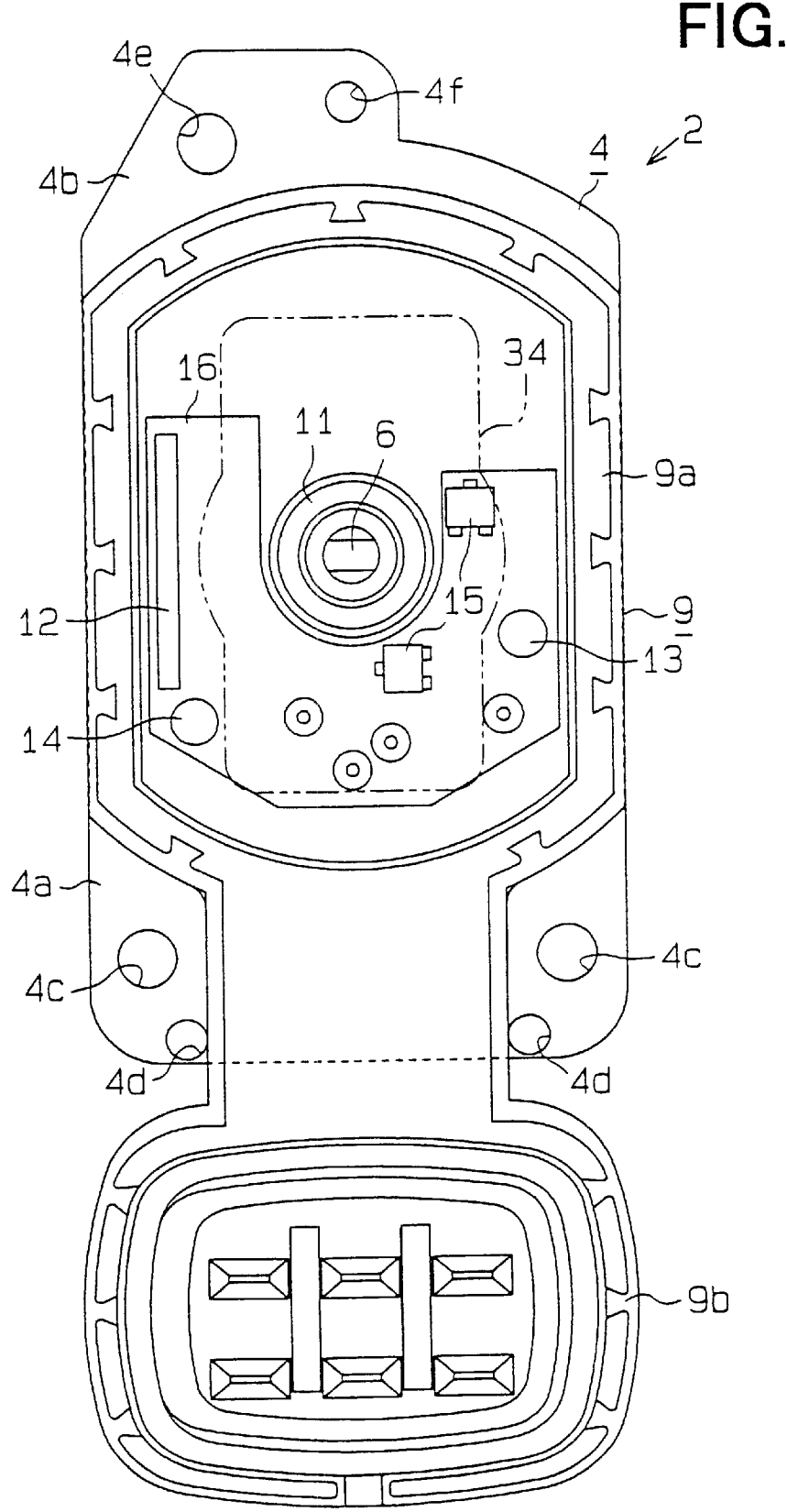
FIG. 3 is a schematic end view of a motor main body of the motor according to the embodiment, showing one end of the motor main body which axially opposes an output unit of the motor.

At the open end of the yoke 4, two flanges 4a, 4b (FIG. 3) are formed to extend outwardly in a longitudinal direction (vertical direction in FIG. 4) of the oblate lateral cross-section of the yoke 4. In the flange 4a (left side in FIG. 1), two screw receiving holes 4c and two positioning holes 4d are formed, as shown in FIG. 3. The screw receiving holes 4c and the positioning holes 4d are formed at lateral end sides (left and right ends in FIG. 3) of the oblate lateral cross-section of the yoke 4. In the flange 4b (right side in FIG. 1), one screw receiving hole 4e and one positioning hole 4f are formed, as shown in FIG. 3. The screw receiving hole 4e is formed at one of the lateral end sides of the oblate lateral cross-section of the yoke 4. The positioning hole 4f is positioned at a lateral center of the oblate lateral-cross section of the yoke 4. The positioning holes 4d, 4f are more distant from an axial center of the yoke 4 than are the screw receiving holes 4c, 4e.

The brush holder 9 is received within and secured to the open end of the yoke 4. A shape of the brush holder 9 corresponds to a shape of the open end of the yoke 4. The brush holder 9 includes a holder main body 9a and a connector 9b. The holder main body 9a is configured to substantially cover the open end of the yoke 4. The connector 9b protrudes outwardly from one 4a (located at the left side in FIG. 1) of the flanges 4a, 4b in a radial direction of the rotatable shaft 6. The brushes 10 are provided on an interior side of the holder main body 9a facing an interior of the yoke 4 and are connected to the connector 9b through undepicted wiring. Similar to the magnets 5, the brushes 10 are arranged along the longitudinal direction of the oblate lateral-cross section of the yoke 4. A bearing 11 is arranged at substantially a center of the holder main body 9a to rotatably support a distal end side of the rotatable shaft 6.

A circuit board 16 that includes circuit elements 12–15 is secured to a yoke 4 exterior side (output unit 3 side) of the holder main body 9a, as shown in FIG. 3. Specifically, a wiring is embedded in the brush holder 9 to extend from the connecting portion 9b to the yoke 4 exterior side of the holder main body 9a. Furthermore, the circuit board 16 has undepicted conductive patterns connected to an exposed part of the wiring 17. The circuit elements 12–15 of the present embodiment include a thermistor 12, a capacitor 13, a choke coil 14 and a Hall IC 15. The thermistor 12 is arranged at one of the lateral end sides of the oblate lateral cross-section of the yoke 4 and extends in the longitudinal direction of the oblate lateral cross-section of the yoke 4.

The brushes 10 are placed adjacent to the commutator 8 to contact the commutator 8. With this arrangement, when electric current is supplied to a coil wound around the armature 7 through the brushes 10 and the commutator 8 from an undepicted control device (external power source) connected to the connecting portion 9b, the armature 7 or the rotatable shaft 6 of the motor main body 2 is rotated.

The output unit 3 includes a gear housing 21, first and second bearings 22a, 22b, a worm member 23, a worm wheel 24 and an output shaft 25.

Figure 4:
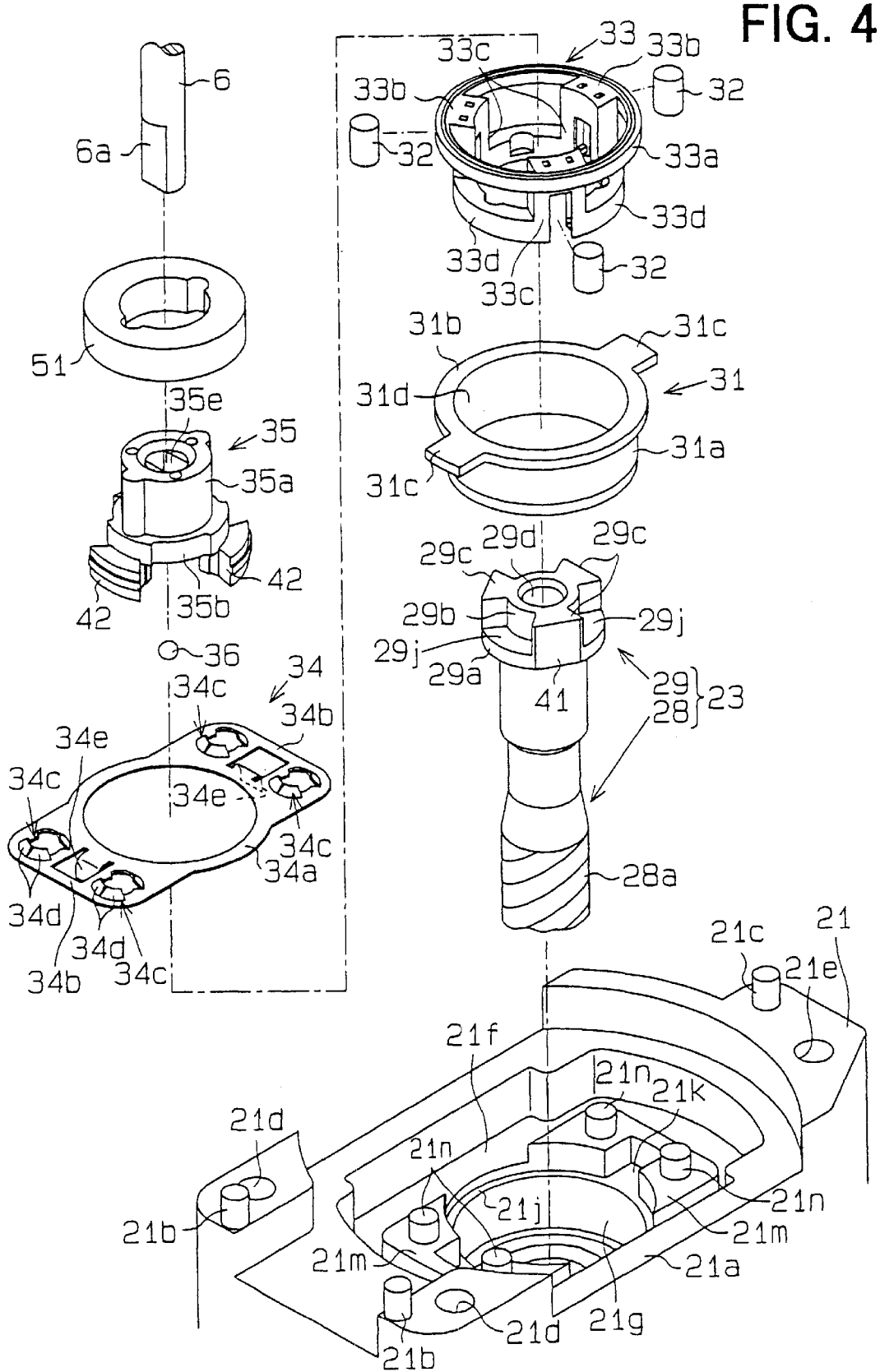
FIG. 4 is an exploded perspective view of a clutch of the motor according to the embodiment.
Figure 5:
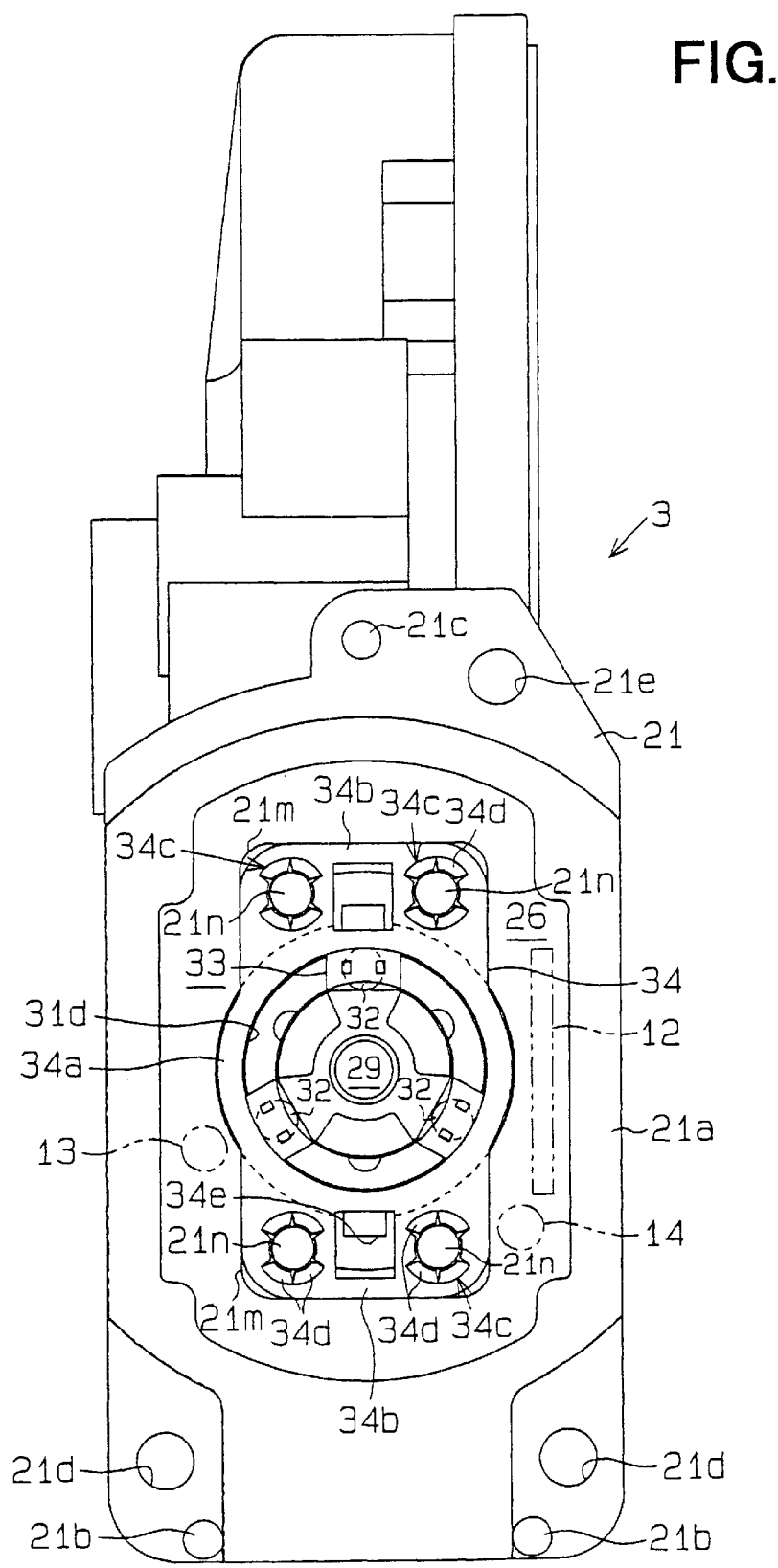
FIG. 5 is a schematic end view of an output unit of the motor according to the embodiment, showing one end of the output unit which axially opposes the one end of the motor main body.

An end (this end is the top side in FIG. 1 and will be hereinafter referred as the top end) of the gear housing 21, to which the motor main body 2 is secured, has an oblate shape that corresponds with the oblate shape of the open end of the yoke 4. With reference to FIGS. 4 and 5, at the top end of the gear housing 21, there is formed an engaging recess 21a within which the holder main body 9a of the brush holder 9 is fitted. Also, at the top end of the gear housing 21, positioning projections 21b, 21c for engaging with the corresponding positioning holes 4d, 4f of the yoke 4 are formed at positions that correspond to the positions of the positioning holes 4d, 4f of the yoke 4, respectively. Furthermore, at the top end of the gear housing 21, threaded holes 21d, 21e are formed at positions that correspond to the positions of the screw receiving holes 4c, 4e of the yoke 4, respectively. The gear housing 21 is secured to the yoke 4 with screws (not shown) that are threadably engaged with the threaded holes 21d, 21e through the screw receiving holes 4c, 4e while the positioning projections 21b, 21c are fitted within the corresponding positioning holes 4d, 4f, and the holder main body 9a is fitted within the engaging recess 21a.

The gear housing 21 has a recess 21f that is recessed from a base of the engaging recess 21a at the center thereof. The recess 21f is elongated in the longitudinal direction of the oblate lateral cross-section of the yoke 4. The above-described circuit elements 12–15 are received in the recess 21f (FIG. 5). The thermistor 12 is arranged in a receiving space 26 that is arranged in the recess 21f at the one of the lateral end sides of the oblate lateral cross-section of the yoke 4 and that extends in the longitudinal direction of the oblate lateral-cross section of the yoke 4. The gear housing 21 further includes a clutch receiving circular recess 21g and a worm shaft receiving recess 21h (FIG. 2). The clutch receiving recess 21g is further recessed from a base of the recess 21f at the center thereof. The worm shaft receiving recess 21h is further recessed from a base of the clutch receiving recess 21g at the center thereof in the axial direction of the rotatable shaft 6. The gear housing 21 further includes a wheel receiving chamber 21i that is communicated with the worm shaft receiving recess 21h in a direction (right direction in FIG. 1) perpendicular to an axial direction of the worm shaft receiving recess 21h at an axially middle portion of the worm shaft receiving recess 21h.

At an opening of the clutch receiving recess 21g, there is formed an annular flange engaging recess 21j. Engaging recesses 21k are continuously formed in the flange engaging recess 21j at the longitudinal ends of the oblate lateral cross-section of the recess 21f and extend in the longitudinal direction of the oblate lateral cross-section of the recess 21f.

At the base of the recess 21f, two base portions 21m are formed. Each base portion 21m is formed to surround the corresponding engaging recess 21k. That is, each base portion 21m is horseshoe-shaped and has a peripheral wall surface that is continuous with a wall surface of the engaging recess 21k. Each base portion 21m has opposed ends that are located adjacent to the lateral end sides of the oblate lateral cross-section of the recess 21f, respectively. Cylindrical engaging projections 21n are formed in top surfaces of the opposed ends of each base portion 21m. A cylindrical bearing support portion 21p is recessed from the base of the clutch receiving recess 21g.

The first and second bearings 22a, 22b are radial bearings made of a metal material (metal bearings), and the first bearing 22a is fitted within the bearing support portion 21p. The second bearing 22b is fitted to an inner peripheral surface of a base portion (bottom side in FIG. 1) of the worm shaft receiving recess 21h.

The worm member 23 includes a worm shaft 28 and a driven-side rotator 29 that is integrally formed with the worm shaft 28 on a motor main body 2 side of the worm shaft 28, as shown in FIG. 4. The worm shaft 28 has a worm 28a in the axially middle part thereof. Furthermore, the worm shaft 28 is rotatably supported by the first and second bearings 22a, 22b at the opposed ends and is received within the worm shaft receiving recess 21h.

The worm wheel 24 is meshed with the worm 28a and is received within the wheel receiving chamber 21i in such a manner that the worm wheel 24 is allowed to rotate about its rotational axial that extends in a direction (direction perpendicular to the drawing surface in FIG. 1) perpendicular to the worm shaft 28. The output shaft 25 is connected to the worm wheel 24 in such a manner that the output shaft 25 rotates about the same rotational axis as the worm wheel 24 when the worm wheel 24 is rotated. The output shaft 25 is connected to a window glass via a known regulator (not shown).

The rotatable shaft 6 is connected to the worm shaft 23 via the clutch C. As shown in FIGS. 2–4, the clutch C includes the driven-side rotator 29, a collar 31, a plurality (three in this embodiment) of rolling elements 32, a support member 33, a stopper 34, a driving-side rotator 35 and a ball 36. The collar 31 includes a cylindrical outer ring 31a, an annular flange portion 31b and a pair of engaging portions 31c. The annular flange portion 31b extends radially outwardly from one end (upper end in FIG. 2) of the cylindrical outer ring 31a. The engaging portions 31c are angularly spaced 180 degrees apart from each other and protrude radially outwardly from the flange portion 31b.

The outer ring 31a of the collar 31 is fitted within the clutch receiving recess 21g. The flange portion 31b of the collar 31 is fitted within the flange engaging recess 21j. The engaging portions 31c are fitted within the corresponding engaging recesses 21k, so that rotation of the collar 31 is prevented. The driven-side rotator 29 is arranged inside of the collar 31.

Figure 6:
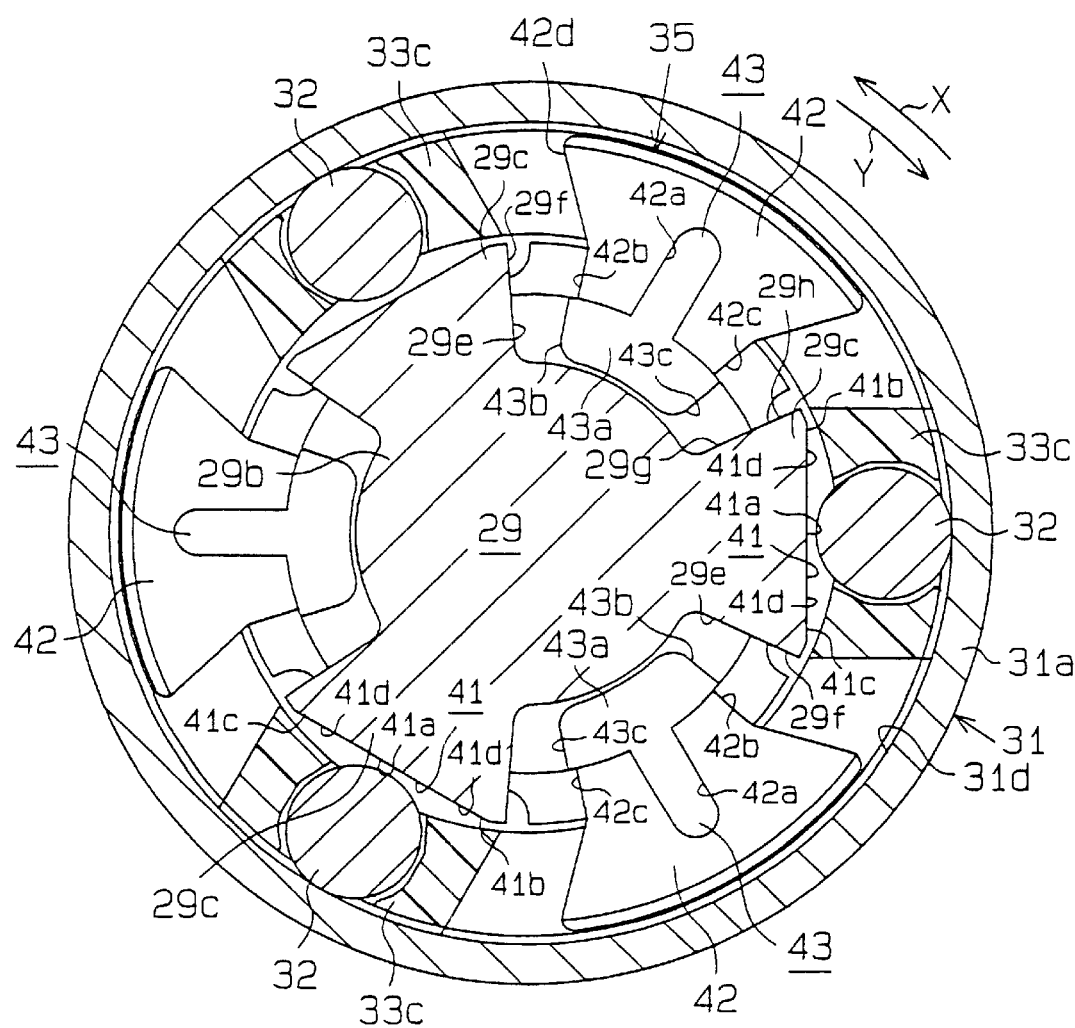
FIG. 6 is a schematic lateral cross-sectional view along line A—A in FIG. 2.

As shown in FIG. 4, the driven-side rotator 29 includes a shaft portion 29b and three engaging projections 29c. The shaft portion 29b extends coaxially from a base end of the worm shaft 28 on the motor main body 2 side (rotatable shaft 6 side). The engaging projections 29c extend radially outwardly from the shaft portion 29b and are spaced at substantially equal angular intervals (about 120 degrees). Each engaging projection 29c has an increasing circumferential width that increases toward a radially distal end thereof. A radially outer surface of each engaging projection 29c constitutes a control surface 41 that is spaced from an inner peripheral surface 31d of the outer ring 31a of the collar 31 for a distance that varies in a rotational direction or circumferential direction, as shown in FIG. 6. Each control surface 41 of the present embodiment is a flat surface that is spaced from the collar 31 for a distance that decreases toward each circumferential end of the control surface 41. With reference to FIGS. 2 and 4, a circular recess 29d is formed at an axial center of the shaft portion 29b on the motor main body 2 side (rotatable shaft 6 side).

As shown in FIG. 4, the driven-side rotator 29 includes reinforcing ribs 29j for reinforcing the engaging projections 29c. Each reinforcing rib 29 is formed in such a manner that the reinforcing rib 29 connects circumferentially opposed lateral surfaces of each circumferentially adjacent pair of engaging projections 29c. A radially inner end of each reinforcing rib 29j extends to and is connected to the shaft portion 29b. That is, each reinforcing rib 29j is constructed such that the reinforcing rib 29j extends radially outwardly from the shaft portion 29b. A radially outer end of each reinforcing rib 29j extends to and is connected to the radially outer ends of the adjacent engaging projections 29c. The radially outer end of each reinforcing rib 29j circumferentially extends along an arc whose center coincides with a rotational axis of the shaft portion 29b. Furthermore, each reinforcing rib 29j is formed at the axial ends of the adjacent engaging projections 29c located on the worm shaft 28 side.

With reference to FIG. 6, each rolling element 32 is made of a resin material (alternatively, each rolling element 32 can be made of a metal material) and is shaped into a generally cylindrical shape. Furthermore, each rolling element 32 is arranged between the control surface 41 of the corresponding engaging projection 29c and the inner peripheral surface 31d of the outer ring 31a. A diameter of the rolling element 32 is smaller than a distance between a center portion (circumferential center) 41a of the control surface 41 and the inner peripheral surface 31d of the outer ring 31a but is longer than a distance between each of end portions (circumferential ends) 41b, 41c of the control surface 41 and the inner peripheral surface 31d of the outer ring 31a. That is, the outer diameter of the rolling element 32 is equal to a distance between the inner peripheral surface 31d of the outer ring 31a and each intermediate portion 41d located between the center portion 41a and each circumferential end 41b or 41c.

The support member 33 rotatably supports the rolling elements 32 spaced at substantially equal angular intervals in generally parallel relationship. More specifically, as shown in FIGS. 2 and 4, the support member 33 is made of a resin material and includes a ring 33a acting as an outward protrusion, three inward protrusions 33b, three pairs of roller supports 33c and three connectors 33d. The ring 33a is formed into an annular shape having an outer diameter larger than that of the outer ring 31a. The inward protrusions 33b extend radially inwardly from an inner peripheral surface of the ring 33a and are spaced at substantially equal angular intervals. Each roller support 33c extends axially from circumferential ends of the corresponding inward protrusion 33b at radially inward of the inward protrusion 33b. Each connector 33d is formed into an arcuate shape that connects one roller support 33c of one pair to the following roller support 33c of the next pair. In each pair of roller supports 33c, two circumferentially opposing engaging projections 33e are formed in distal ends of the roller supports 33c. Each rolling element 32 is held between the paired roller supports 33c and also between the inward protrusion 33b and the opposing engaging projections 33e in such a manner that the rolling element 32 is immovably held with respect to the ring 33a in a circumferential direction and also in an axial direction. The support member 33, which holds the rolling elements 32 in the above-described manner, is positioned such that each roller support 33c is inserted into the inside of the outer ring 31a to position each rolling element 32 between the corresponding control surface 41 and the inner peripheral surface 31d of the outer ring 31a, and the ring 33a abuts the flange portion 31b.

The stopper 34 is made of a metal plate having a generally uniform thickness throughout it. The stopper 34 includes an engaging part 34a and a pair of extended parts 34b. The engaging part 34a of the stopper 34 is annular and has a central through hole that penetrates through the center of the engaging part 34a. An inner diameter of the engaging part 34a is substantially equal to the inner diameter of the ring 33a of the support member 33. The extended parts 34b are angularly spaced 180 degrees apart from each other and protrude radially outwardly from the engaging part 34a. A width of each extended part 34b substantially corresponds to a width of the base portion 21m (FIG. 5) but is slightly smaller than an outer diameter of the engaging part 34a. The entire stopper 34 is generally rectangular shaped. With reference to FIG. 2, an inner diameter and the outer diameter of the engaging part 34a are substantially the same as the inner diameter and the outer diameter of the cylindrical outer ring 31a of the collar 31, respectively. Each extended part 34b includes securing portions 34c. The securing portions 34c are provided at each longitudinal end of the stopper 34 near each lateral side of the stopper 34. More specifically, the securing portions 34 are provided at each corner of the stopper 34 in such a manner that positions of the securing portions 34c correspond to the positions of the corresponding engaging projections 21n of the gear housing 21. Each securing portion 34c of the present embodiment includes four resilient pieces 34d. Each resilient piece 34d is formed by cutting a corresponding corner portion of the stopper 34 and then bending it obliquely. The four resilient pieces 34d are divided into two pairs of adjacent resilient pieces 34d. The two pairs of adjacent resilient pieces 34d are arranged to oppose each other. Distal ends of the resilient pieces 34d in one pair are spaced from distal ends of the resilient pieces 34d in the other pair for a distance that is slightly smaller than an outer diameter of the corresponding engaging projection 21n. With this arrangement, when the engaging projection 21n is inserted between the two pairs of adjacent resilient pieces 34d, the resilient pieces 34d engage the engaging projection 21n in such a manner that the resilient pieces 34d prevent the engaging projection 21n from moving out of engagement with the resilient pieces 34d (the resilient pieces 34d axially immovably engaging with the engaging projection 21n) The stopper 34 is secured to the gear housing 21 once each engaging projection 21n is inserted within the corresponding securing portion 34c or between the opposed pairs of the resilient pieces 34d. The engaging part 34a of the stopper 34 is placed over the ring 33a of the support member 33 (placed at the top side in FIG. 1). Once the ring 33a of the support member 33 abuts against the engaging part 34a of the stopper 34, the stopper 34 prevents axial movement of each rolling element 32 in cooperation with the support member 33.

As shown in FIGS. 2 and 4, a restricting portion 34e is formed at substantially middle of each extended part 34b. Each restricting portion 34e is formed by cutting a corresponding portion of the extended part 34b and then bending it. Each restricting portion 34e engages the corresponding engaging portion 31c of the collar 31 and restricts the axial movement of the collar 31. Once each restricting portion 34e engages the engaging portion 31c of the collar 31, a predetermined distance between the engaging part 34a of the stopper 34 and the flange portion 31b of the collar 31 is maintained, and the ring 33a is prevented from being clamped between the engaging part 34a of the collar 31 and the flange portion 31b of the collar 31.

The driving-side rotator 35 is made of a resin material and includes a shaft portion 35a, a disk portion 35b and a protruding portion 35c. The disk portion 35b has an outer diameter larger than an outer diameter of the shaft portion 35a. The protruding portion 35c protrudes from an axial center of the disk portion 35b in the axial direction (toward the bottom side in FIG. 2). In the driving-side rotator 35, a ball receiving recess 35d is formed in a distal end of the protruding portion 35c. The ball receiving recess 35d is formed by recessing a surrounding wall in a direction perpendicular to the axial direction to provide a spherical shape. The ball receiving recess 35d axially extends into a portion of the disk portion 35b. The ball 36 is held in the ball receiving recess 35d such that a portion of the ball 36 protrudes from the distal end of the protruding portion 35c.

At the axial center of the driving-side rotator 35, an annular recess 35e having diametrically opposing flat inner surfaces extends from a base end (upper end in FIG. 2) of the shaft portion 35a and communicates with the ball receiving recess 35d. The driving-side rotator 35 is non-rotatably connected to the rotatable shaft 6 by engaging the annular protrusion 6a having diametrically opposing flat outer surfaces to the annular recess 35e having the diametrically opposing flat inner surfaces. The protruding portion 35c is substantially received within the recess 29d of the driven-side rotator 29, and the ball 36, which partially protrudes from the distal end of the protruding portion 35c, contacts a base of the recess 29d.

As shown in FIG. 4, a plurality (three in this embodiment) of generally fan-shaped protrusions 42 that extend radially outwardly and also extend in the axial direction are arranged at substantially equal angular intervals on the distal end side (bottom side in FIG. 2) of the disk portion 35b of the driving-side rotator 35. Each protrusion 42 includes an arcuate outer surface that extends along the inner peripheral surface 31d of the outer ring 31a. The arcuate outer surface of each protrusion 42 extends along an arc whose diameter is slightly smaller than the inner diameter of the inner peripheral surface 31d of the outer ring 31a, as shown in FIG. 6. That is, the driving-side rotator 35 is constructed such that the protrusions 42 can be inserted in the axial direction through the central through hole of the engaging part 34a of the stopper 34. In each protrusion 42, a coupling groove 42a extends halfway from an inner peripheral surface of each protrusion 42 in a radially outward direction. Each protrusion 42 is arranged between the engaging projections 29c and also between the rolling elements 32 (roller supports 33c) within the outer ring 31a.

A cushion member 43 made of a rubber material is securely coupled to the coupling groove 42a of each protrusion 42. Cushion segments 43a are formed in the cushion member 43. Each cushion segment 43a extends radially inwardly from the coupling groove 42a of each protrusion 42 and also extends in the circumferential direction.

As shown in FIG. 6, a circumferential width of each cushion segment 43a is slightly longer than a circumferential width of an inner peripheral surface of the corresponding protrusion 42.

One side surface (counter-clockwise side surface) 43b of each cushion segment 43a engages a first cushion surface 29e that is formed at a radially inward region of a clockwise side surface of the engaging projection 29c when the driving-side rotator 35 is rotated to a predetermined position in the counter-clockwise direction (the direction of an arrow X) relative to the driven-side rotator 29. One side surface (counter-clockwise side surface) 42b formed at a radially inward region of the protrusion 42 engages a first engaging surface 29f formed at a radially outward region of the clockwise side surface of the engaging projection 29c when the driving-side rotator 35 is further rotated in the counter-clockwise direction (the direction of the arrow X) beyond the predetermined position. Since the cushion segment 43a is deformed in the circumferential direction, the driving-side rotator 35 is allowed to rotate beyond the predetermined position in the counter-clockwise direction (the direction of the arrow X), as shown in FIG. 7.

The other side surface (counter-clockwise side surface) 43c of each cushion segment 43a engages a second cushion surface 29g that is formed at a radially inward region of a counter-clockwise side surface of the engaging projection 29c when the driving-side rotator 35 is rotated to a predetermined position in the clockwise direction (direction of an arrow Y) relative to the driven-side rotator 29. The other side surface (clockwise side surface) 42c formed at the radially inward region of the protrusion 42 engages a second engaging surface 29h formed at a radially outward region of the counter-clockwise side surface of the engaging projection 29c when the driving-side rotator 35 is further rotated in the clockwise direction (the direction of the arrow Y) beyond the predetermined position. Since the cushion segment 43a is deformed in the circumferential direction, the driving-side rotator 35 is allowed to rotate beyond the predetermined position in the clockwise direction (the direction of the arrow Y).

Figure 7:
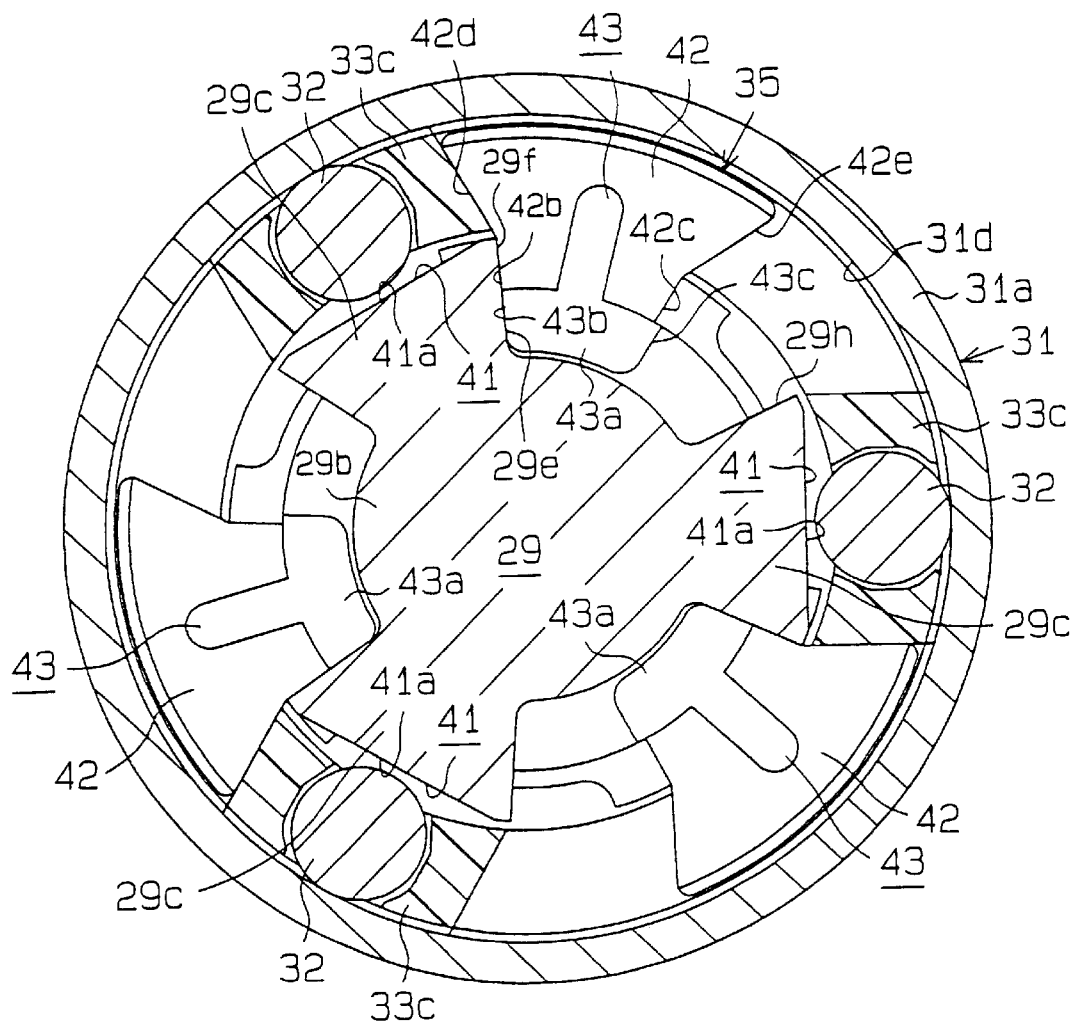
FIG. 7 is another schematic lateral cross-sectional view of the clutch according to the embodiment.

With reference to FIG. 7, each component 32, 42, 29c or 33c is configured in the following manner. That is, each rolling element 32 is placed at the center portion 41a of the corresponding control surface 41 when the one side surface 42b of the corresponding protrusion 42 engages the first engaging surface 29f of the engaging projection 29c, and a first urging surface 42d formed at the radially outward region of the counter-clockwise side surface of the protrusion 42 engages the corresponding roller support 33c.

Each component 32, 42, 29c or 33c is also configured in the following manner. That is, each rolling element 32 is placed at the center portion 41a of the corresponding control surface 41 when the other side surface 42c of the corresponding protrusion 42 engages the second engaging surface 29h of the engaging projection 29c, and a second urging surface 42e formed at the radially outward region of the clockwise side surface of the protrusion 42 engages the corresponding roller support 33c.

As shown in FIG. 2, a sensor magnet 51 that constitutes the rotational sensor S in cooperation with the Hall ICs 15 is secured to an outer peripheral surface of the shaft portion 35a of the driving-side rotator 35. Each Hall IC 15 is axially aligned with and opposes a portion of an outer peripheral edge of the sensor magnet 51 such that the Hall IC 15 generates a pulse signal corresponding with a rotational speed of the sensor magnet 51 or a rotational speed of the rotatable shaft 6 and outputs it to the control device. The control device controls the electric current to be supplied based in the pulse signal.

The motor 1 (clutch C) having the above-described structure is assembled as follows.

First, the worm member 23 (the worm shaft 28 and the driven-side rotator 29), the collar 31, the support member 33 holding the rolling elements 32, and the stopper 34 are installed in the gear housing 21 in this order. More specifically, the worm shaft 28 of the worm member 23 is inserted into the worm shaft receiving recess 21h and is held within the first and second bearings 22a and 22b. Next, the outer ring 31a of the collar 31 is fitted within the clutch receiving recess 21g, and the engaging portions 31c are fitted within the corresponding engaging recesses 21k, respectively. Then, the rolling elements 32 are received and are held within the support member 33 which is, in turn, inserted into the inside of the outer ring 31a. Thereafter, the stopper 34 is secured to the gear housing 21 by inserting the engaging projections 21n of the gear housing 21 within the corresponding securing portions 34c (i.e., by engaging each engaging projection 21n with the corresponding resilient pieces 34d).

The driving-side rotator 35 is secured to the rotatable shaft 6 of the motor main body 2. More specifically, the annular protrusion 6a of the rotatable shaft 6 having the diametrically opposing flat outer surfaces is fitted within the annular recess 35e of the driving-side rotator 35 having the diametrically opposing flat inner surfaces. In the present embodiment, the sensor magnet 51 is secured to the shaft portion 35a of the driving-side rotator 35 before conducting this step.

Next, the motor main body 2 is secured to the output unit 3, and the driving-side rotator 35 is connected to the other components of the clutch C. Specifically, the positioning projections 21b, 21c are fitted within the corresponding positioning holes 4d, 4f of the yoke 4. Furthermore, the protrusions 42 of the driving-side rotator 35 are received in the inside of the outer ring 31a of the collar 31 (specifically, between the engaging projections 29c of the driven-side rotator 29 and also between the rolling elements 32) through the central through hole of the engaging part 34a of the stopper 34. Then, the yoke 4 is secured to the gear housing 21 with screws (not shown) that are threadably engaged with the threaded holes 21d, 21e through the screw receiving holes 4c, 4e.

The power window system (motor 1) having the above-described construction operates as follows.

When the motor main body 2 is driven to rotate the rotatable shaft 6 in the counter-clockwise direction (the direction of the arrow X) in FIG. 6, the driving-side rotator 35 (protrusions 42) is rotated integrally with the rotatable shaft 6 in the same direction (the direction of the arrow X). Then, as shown in FIG. 7, when the one side surface 42b of each protrusion 42 engages the first engaging surface 29f of the corresponding engaging projection 29c, and the first urging surface 42d of the protrusion 42 engages the corresponding roller support 33c, the corresponding rolling element 32 is positioned in the center portion 41a of the corresponding control surface 41 (this position is hereinafter called a "neutral position").

Prior to the engagement of the one side surface 42b of the protrusion 42 with the first engaging surface 29f, the one side surface 43b of the corresponding cushion segment 43a engages the first cushion surface 29e of the corresponding engaging projection 29c to reduce the shocks generated by the engagement.

At this neutral position, each rolling element 32 is not clamped between the corresponding control surface 41 of the engaging projection 29c and the inner peripheral surface 31d of the outer ring 31a, so that the driven-side rotator 29 is allowed to rotate relative to the collar 31. Thus, when the driving-side rotator 35 is further rotated in the counter-clockwise direction, the rotational force of the driving-side rotator 35 is transmitted to the driven-side rotator 29 via the protrusions 42, so that the driven-side rotator 29 is rotated along with the driving-side rotator 35. At this time, the rotational force is applied to each rolling element 32 from the corresponding first urging surface 42d in the same direction (the direction of the arrow X), so that the rolling element 32 is moved in this direction.

Alternatively, when the rotatable shaft 6 is rotated in the clockwise direction (the direction of the arrow Y) in FIG. 6, each rolling element 32 is positioned in the neutral position by the protrusion 42. At this neutral position, each rolling element 32 is not clamped between the corresponding control surface 41 of the engaging projection 29c and the inner peripheral surface 31d of the outer ring 31a, so that the driven-side rotator 29 is allowed to rotate relative to the collar 31. Thus, the rotational force of the driving-side rotator 35 is transmitted to the driven-side rotator 29 through the protrusions 42, so that the driven-side rotator 29 is rotated along with the driving-side rotator 35.

Thus, the rotation of the driven-side rotator 29 causes the worm shaft 28 to be rotated, and thereby rotating the worm wheel 24 and the output shaft 25. Thus, the window glass connected to the output shaft 25 is moved downward or upward.

Figure 8:
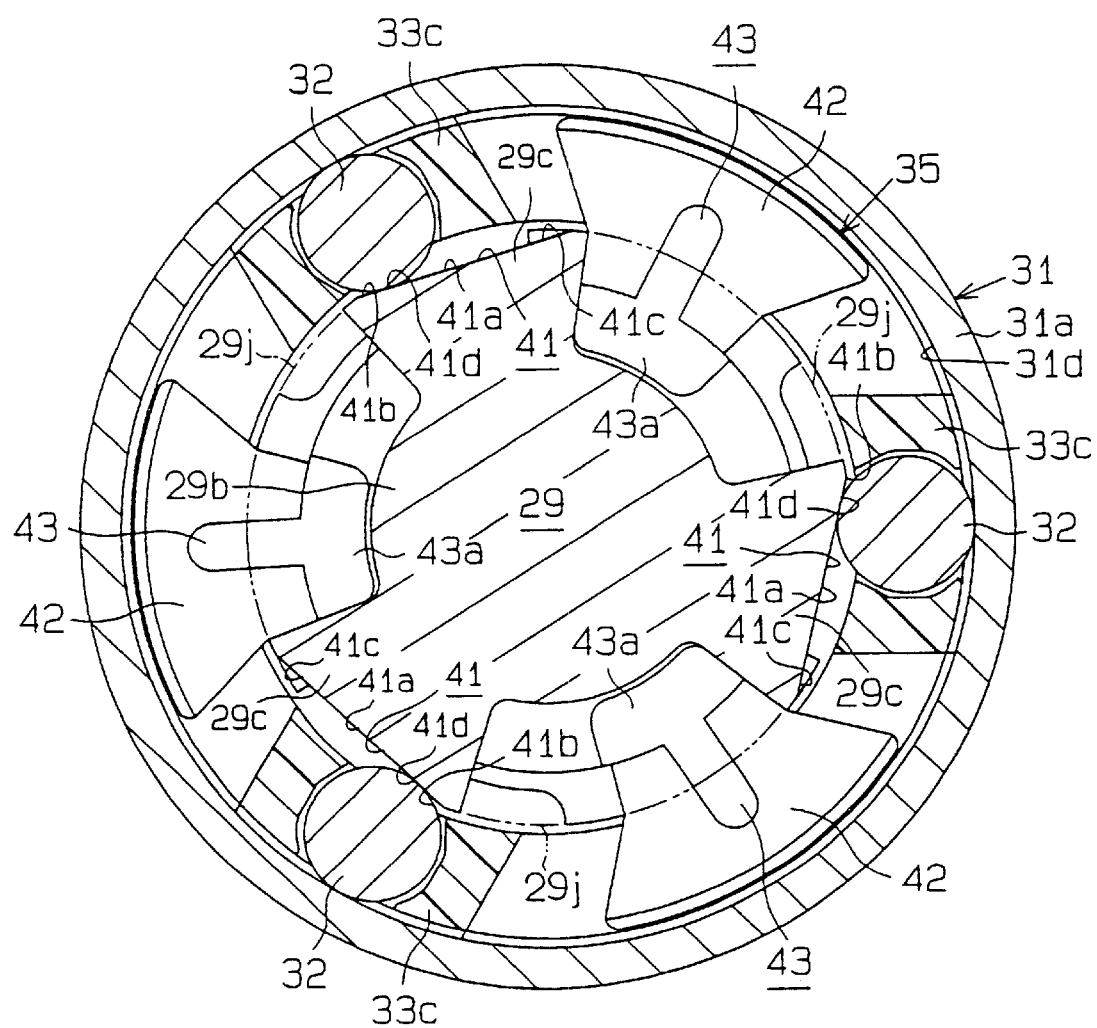
FIG. 8 is another schematic lateral cross-sectional view of the clutch according to the embodiment.
Figure 9:
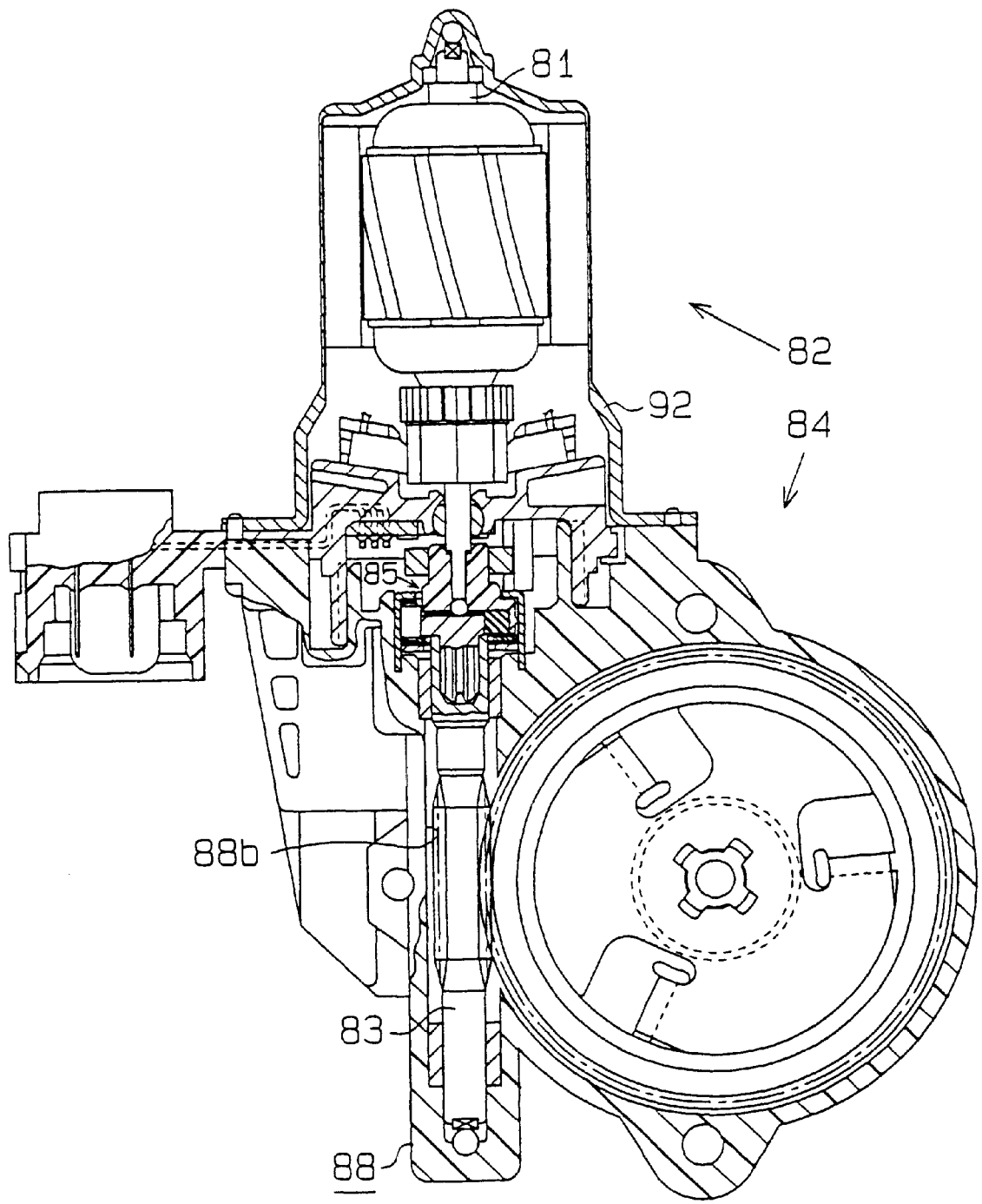
FIG. 9 is a schematic longitudinal cross-sectional view of a previously proposed motor.
Figure 10:
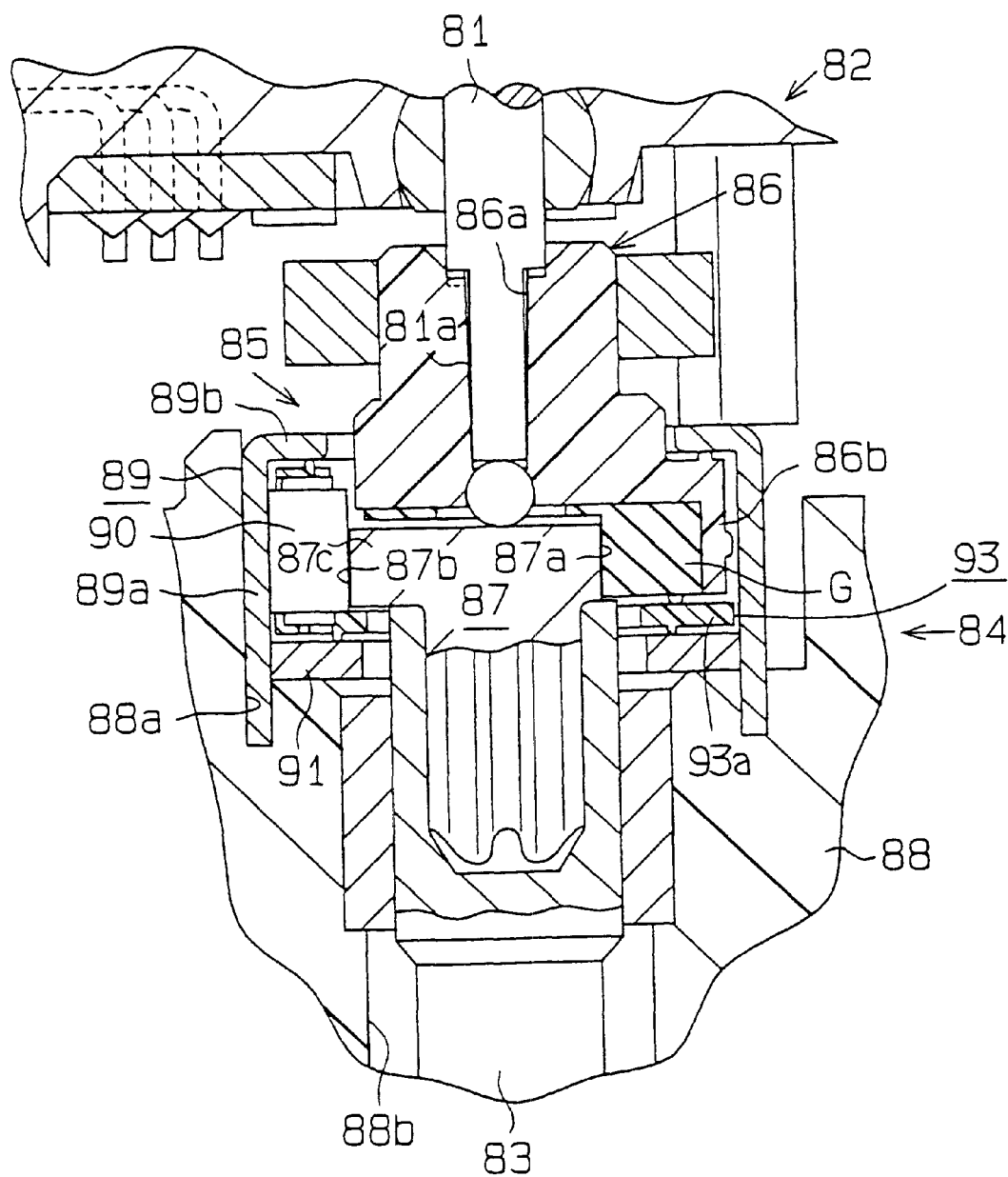
FIG. 10 is a schematic enlarged partial longitudinal cross-sectional view of the previously proposed motor.

When the motor 1 is not actuated, a load applied to the output shaft 25 causes the driven-side rotator 29 to rotate. Then, when the driven-side rotator 29 is rotated in the clockwise direction (the direction of the arrow Y) in FIG. 6, each rolling element 32 moves toward the circumferential end 41b (more specifically, toward the intermediate portions 41d) of the corresponding control surface 41 of the engaging projection 29c. Then, as shown in FIG. 8, when the rolling element 32 reaches the intermediate portion 41d, the rolling element 32 is claimed between the control surface 41 and the inner peripheral surface 31d of the outer ring 31a (locked state). Since the outer ring 31a is secured, the driven-side rotator 29 cannot be rotated further, so that the driving-side rotator 35 cannot be rotated by the driven-side rotator 29.

On the other hand, when the driven-side rotator 29 is rotated in the counter-clockwise direction (the direction of the arrow X) in FIG. 6, each rolling element 32 moves toward the circumferential end 41c (more specifically, toward the intermediate portions 41d) of the corresponding control surface 41 of the engaging projection 29c due to the fact that the driving-side rotator 35 is stopped. Then, when the rolling element 32 reaches the intermediate portion 41d, the rolling element 32 is clamped between the control surface 41 and the inner peripheral surface 31d of the outer ring 31a (locked state). Since the outer ring 31a is secured, the driven-side rotator 29 cannot be rotated further, so that the driving-side rotator 35 cannot be rotated by the driven-side rotator 29.

As described above, even if a large load is applied to the output shaft 25, the rotation of the driven-side rotator 29 is prevented. Thus, the window glass that is connected to the output shaft 25 is effectively prevented from moving upward and downward by its own weight or an external force.

Characteristic advantages of the above-described embodiment will be described below.

(1) The stopper 34 includes the securing portions 34c that are located at the longitudinal end sides of the top end of the oblate gear housing 21. The stopper 34 is secured to the gear housing 21 by inserting each engaging projection 21n of the gear housing 21 within the corresponding securing portion 34c (by engaging each engaging projection 21n with the resilient pieces 34d). Thus, a size of the stopper 34 is not increased in the lateral direction (left-right direction in FIG. 5) of the top end of the gear housing 21. In this way, a size (thickness) of the gear housing 21 is not increased in the lateral direction of the top end of the gear housing 21, so that it is possible to minimize the thickness of the motor 1. Furthermore, the gear housing 21 is provided with the receiving space 26 that extends in the longitudinal direction (top-bottom direction in FIG. 5) of the top end of the gear housing 21 for accommodating the elements, such as the thermistor 12 and the like.

(2) The support member 33, which maintains a predetermined space between each two adjacent rolling elements 32, has the ring 33a acting as the outward protrusion extending radially outwardly from the inner peripheral surface 31d of the collar 31 at the axial end of the collar 31. The support member 33 is prevented from moving in the axial direction upon abutment of the ring 33a against the engaging part 34a of the stopper 34. The stopper 34 is placed radially outward of the inner peripheral surface 31d of the outer ring 31a of the collar 31. Thus, after the collar 31, the support member 33 supporting the rolling elements 32, and the stopper 34 are installed in the gear housing 21, the driving-side rotator 35 can be inserted within the outer ring 31a of the collar 31 through the central through hole of the engaging part 34a of the stopper 34.

(3) The stopper 34 includes the engaging part 34a and the extended parts 34b. The engaging part 34a is formed into the annular shape having the inner diameter that is substantially the same as that of the ring 33a of the support member 33. Each extended part 34b extends from the engaging part 34a in the longitudinal direction of the top end of the gear housing 21 and has the securing portions 34c. Thus, the size of the stopper 34 is not increased in the lateral direction of the top end of the gear housing 21 beyond the ring 33a. Furthermore, the stopper 34 is the single component having the simple structure.

(4) The collar 31 includes the engaging portions 31c, which are fitted within the corresponding engaging recesses 21k of the housing 21 and are immovably engaged with the corresponding engaging recesses 21k in the circumferential direction. The engaging portions 31c also contact the restricting portions 34e formed in the extended parts 34b of the stopper 34, respectively, such that the axial movement of the collar 31 is prevented by the restricting portions 34e. Thus, a size of the member (restricting portions 34e) for securing the collar 31 is not increased in the lateral direction of the top end of the gear housing 21. Furthermore, the collar 31 does not need to have a structure for securing the collar 31 to the gear housing 21. The stopper 34 acts as the member for restricting the axial movement of the rolling elements 32 and also the member for securing the collar 31, so that the number of the components can be reduced.

(5) The stopper 34 is made of the plate material having the uniform thickness throughout it, so that the stopper 34 can be manufactured at a relatively low manufacturing cost.

(6) Each restricting portion 34e of the stopper 34 is formed by cutting the corresponding portion of the respective extended part 34b and then bending it. Thus, the restricting portion 34e of the stopper 34 can be relatively easily manufactured.

(7) Each securing portion 34c of the stopper 34 is made of resilient pieces 34d, each of which is formed by cutting the corresponding portion of the stopper 34 and bending it obliquely and is axially immovably engaged with the corresponding engaging projection 21n formed in the gear housing 21. Thus, the securing portions 34c of the stopper 34 can be relatively easily manufactured. Also, each securing portion 34c of the stopper 34 can be relatively easily engaged with the corresponding engaging projection 21n.

(8) The clutch C is constructed such that the above components can be installed to the gear housing 21 one by one before connecting the motor main body 2 to the output unit 3. Furthermore, each component is installed into the gear housing 21 that acts as the base component. Thus, the assembling cost can be reduced.

(9) The securing portions 34c for securing the stopper 34 are located at the longitudinal end sides of the top end of the gear housing 21. The receiving space 26 is provided in the recess 21f of the gear housing 21 near the stopper 34 and extends in the longitudinal direction of the recess 21f. The elements, such as the thermistor 12 and the like, are received in the receiving space 26. Thus, it is not required to provide a space for receiving the elongated elements, such as the thermistor 12 and the like, in the other place.

(10) The extended parts 34b are angularly spaced 180 degrees apart from each other about the engaging part 34a, and the securing portions 34c are formed in the extended parts 34b. Thus, the stopper 34 is secured to the gear housing 21 at the locations that are angularly spaced 180 degrees apart from each other about the engaging part 34a. Thus, the stopper 34 can be securely connected to the gear housing 21.

Figure 11:
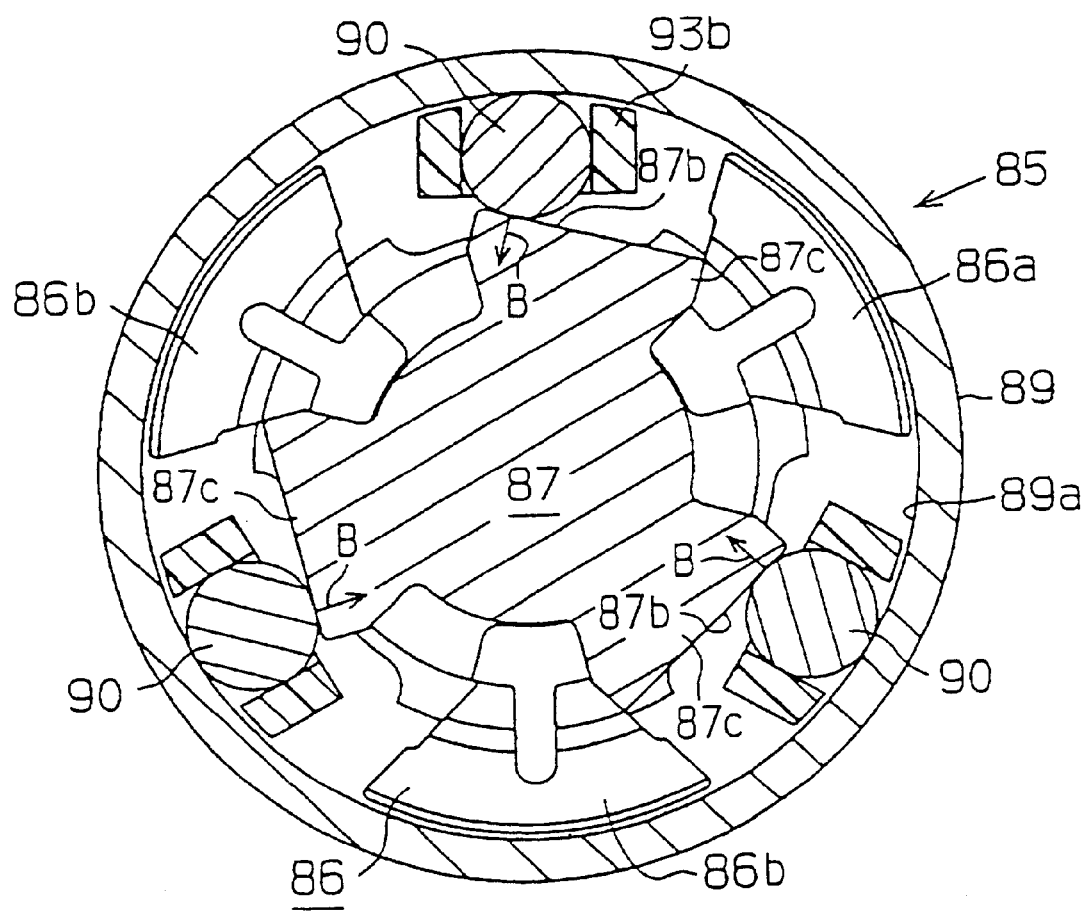
FIG. 11 is a schematic lateral cross-sectional view of a previously proposed clutch of the previously proposed motor.

(11) The reinforcing ribs 29j for reinforcing the engaging projections 29c are provided in the driven-side rotator 29, so that deformation or damage of the engaging projections 29c is advantageously restrained. That is, when each rolling element 32 is clamped between the corresponding control surface 41 and the inner peripheral surface 31d of the outer ring 31a (locked state), a radial pressure is radially inwardly applied to the intermediate portion 41d of the control surface 41 from the rolling element 32 (in a direction similar to the direction of arrow B in FIG. 11). Even if the driven-side rotator 29 is abruptly locked during rapid rotation of the driven-side rotator 29, the deformation or damage of each engaging projection 29c is advantageously restrained by the reinforcing ribs 29j (indicated with a dot-dot-dash line in FIG. 8). Furthermore, even after the driven-side rotator 29 is locked multiple times, the reinforcing ribs 29j advantageously restrain the deformation or damage of each engaging projection 29c. As a result, a malfunction of the clutch C is advantageously restrained, thereby restraining a malfunction of the motor 1.

(12) Each reinforcing rib 29j is formed to connect the circumferentially opposed lateral surfaces of each circumferentially adjacent pair of engaging projections 29c, so that the deformation or damage of the engaging projections 29c is further advantageously restrained.

(13) The radially inner end of each reinforcing rib 29j extends to and is connected to the shaft portion 29b, so that the deformation or damage of the engaging projections 29c is further advantageously restrained.

(14) The radially outer end of each reinforcing rib 29j extends to and is connected to the radially outer ends of the adjacent engaging projections 29c, so that the deformation or damage of the engaging projections 29c is further advantageously restrained.

(15) The radially outer end of each reinforcing rib 29j circumferentially extends along the arc whose center coincides with the rotational axis of the shaft portion 29b. Thus, in a case of manufacturing the driven-side rotator 29 from a cylindrical material by milling, the milling operation for the outer peripheral surface of each reinforcing rib 29j is not required, so that the manufacturing of the driven-side rotator 29 can be more easily carried out.

(16) Furthermore, each reinforcing rib 29j is formed at the axial ends of the adjacent engaging projections 29c located on the worm shaft 28 side (i.e., the side opposite to the driving-side rotator 35). Thus, each first engaging surface 29f, which is engageable with the corresponding protrusion 42 of the driving-side rotator 35, can have a relatively long axial length within the corresponding engaging projection 29c. As a result, the deformation or the damage of the first engaging surface 29f, which engages the corresponding protrusion 42, is advantageously restrained.

The above embodiment can be modified as follows. In the above embodiment, the support member 33 has the annular ring 33a acting as the outward protrusion extending radially outwardly from the inner peripheral surface 31d of the collar 31 at the axial end of the collar 31. The support member 33 is prevented from moving in the axial direction upon abutment of the ring 33a against the stopper 34. The ring 33a can be any other type of outward protrusion having a shape other than the annular shape. For example, the outward protrusion can be changed to one that radially outwardly extends from each inward protrusion 33b. Even with this arrangement, it is possible to accomplish the advantages similar to those described in the above embodiment.

In the above embodiment, the stopper 34 includes the engaging part 34a and the extended parts 34b. The engaging part 34a is formed into the annular shape having the diameter that is substantially the same as that of the ring 33a. Each extended part 34b extends from the engaging part 34a in the longitudinal direction of the top end of the gear housing 21 and has the securing portions 34c. However, the stopper can be modified to any other form as long as it has an engaging part, which engages against the ring 33a to prevent the axial movement of the ring 33a, and securing portions, which extend in the longitudinal direction of the top end of the gear housing 21 and are secured to the gear housing 21. For example, it is possible to provide two non-annular engaging parts that are angularly spaced 180 degrees apart from each other with respect to the ring 33a. Each engaging part may have a securing portion that extends in the longitudinal direction of the top end of the gear housing 21 and is to be secured to the gear housing 21. Even with this arrangement, it is possible to accomplish the advantages similar to those described in the above sections (1), (2) and (4)–(10).

In the above embodiment, the collar 31 includes the engaging portions 31c, which are fitted within the corresponding engaging recesses 21k and are immovably engaged with the corresponding engaging recesses 21k in the circumferential direction. The engaging portions 31c also contact the restricting portions 34e formed in the extended parts 34b of the stopper 34, respectively, such that the axial movement of the collar 31 is prevented by the restricting portions 34e. This can be modified such that the collar 31 itself is secured to the gear housing 21. Even with this arrangement, it is possible to accomplish the advantages similar to those described in the above sections (1)–(3), (5) and (7)–(10). In this case, it is required to provide a structure for securing the collar 31 to the gear housing 21.

In the above embodiment, the stopper 34 is made of the plate material having the uniform thickness throughout it. However, the stopper 34 can have any other form as long as it provides functions similar to those described above. For instance, the stopper 34 can be changed, for example, to a molded product having different thicknesses. In this case, portions having functions similar to those of the securing portions 34c and the restricting portions 34e can be simultaneously molded with a mold(s). Even with this arrangement, it is possible to accomplish the advantages similar to those described in the above sections (1)–(4) and (8)–(10).

In the above embodiment, the restricting portions 34e of the stopper 34 are formed by cutting and bending the corresponding portions of the extended parts 34b. Alternatively, the restricting portions 34 can be formed by simply bending some corresponding portions of the extended parts 34b. The restricting portions 34e can be portions that are extended from the engaging part 34a and are then bent. Even in this way, the restricting portions can be easily formed.

In the above embodiment, the securing portions 34c made of resilient pieces 34d are formed in the stopper 34, and the engaging projections 21n of the gear housing 21 are received within the securing portions 34c (engaging the engaging projections 21n with the resilient pieces 34d) to secure the stopper 34 to the gear housing 21. However, the securing portions 34c and the engaging projections 21n can be modified to any other forms as long as they can secure the stopper 34 to the gear housing 21. For example, screw receiving holes may be formed to penetrate through the extended parts 34b of the stopper 34, and corresponding threaded holes may be formed in the base portions 21m of the gear housing 21. The stopper 34 may be secured to the base portions 21m by inserting screws through the screw receiving holes of the extended parts 34b and threadably engaging the screws with the threaded holes formed in the base portions 21m of the gear housing 21. Even with this arrangement, it is possible to accomplish the advantages similar to those described in the above sections (1)–(6) and (8)–(10). Furthermore, for example, engaging holes may be formed in the extended parts 34b of the stopper 34, and engaging projections may be formed in the base portions 21m of the gear housing 21. The stopper 34 may be secured to the gear housing 21 by inserting the engaging projections of the base portions 21m within the engaging holes of the extended parts 34b of the stopper 34.

Even in this way, the securing portions can be easily formed. Also, the installing operation of the stopper to the gear housing is eased.

In the above embodiment, although the four engaging projections 21n of the gear housing 21 and the four securing portions 34c of the stopper 34 are provided, the number of the engaging projections 21n of the gear housing 21 and the number of the securing portions 34c of the stopper 34 can be modified to any numbers. For example, two diagonally aligned engaging projections 21n and two corresponding diagonally aligned securing portions 34c can be eliminated while the other two diagonally aligned engaging projections 21n and the other two corresponding diagonally aligned securing portions 34c are left. In this way, the number of the securing portions (resilient pieces 34d) to be manufactured is reduced, allowing a reduction in the manufacturing cost of the stopper 34.

In the above embodiment, the clutch C is constructed such that the above components can be installed to the gear housing 21 one by one before connecting the motor main body 2 to the output unit 3. Furthermore, each component is installed into the gear housing 21 that acts as the base component. Thus, the assembling cost can be reduced. The base component can be changed to any other component. Even with this arrangement, it is possible to accomplish the advantages similar to those described in the above sections (1)–(7), (9) and (10).

In the above embodiment, the receiving space 26 is provided in the recess 21f of the gear housing 21 near the stopper 34 and extends in the longitudinal direction of the recess 21f. The elements, such as the thermistor 12 and the like, are received in the receiving space 26. However, if the entire size of the motor 1 is too small with respect to the clutch C, the receiving space 26 can be eliminated. Even with this arrangement, the size (thickness) of the gear housing is not increased in the lateral direction of the top end of the gear housing.

In the above embodiment, the two extended parts 34b having the securing portions 34c are angularly spaced 180 degrees apart from each other about the engaging part 34a. However, the number of the extended parts 34b is not limited to two. As long as each extended part 34a extends in the longitudinal direction of the top end of the gear housing 21, the number of the extended parts 34a can be, for example, one or four. Even with this arrangement, it is possible to accomplish the advantages similar to those described in the above sections (1)–(9).

In the above embodiment, each rolling element 32 is shaped into the generally cylindrical shape. However, each rolling element 32 can be shaped into a spherical shape. In such a case, the shape of the support member 33 also needs to be modified to correspond with this change. Even with this arrangement, it is possible to accomplish the advantages similar to those described in the above embodiment.

In the above embodiment, the driven-side rotator 29 is formed integrally with the worm shaft 28. However, the driven-side rotator 29 can be provided as a separate member that is separated from the worm shaft 28 as long as the driven-side rotator 29 can rotate integrally with the worm shaft 28. Even with this arrangement, it is possible to accomplish the advantages similar to those described in the above embodiment.

In the above embodiments, the present invention is embodied in the motor 1 of the power window system. However, the present invention can be embodied in a motor used in any other type of device.

In the above embodiment, each reinforcing rib 29j is formed to connect the circumferentially opposed lateral surfaces of each circumferentially adjacent pair of engaging projections 29c. However, each reinforcing rib 29j can have any other form as long as it restrains the deformation or damage of the engaging projections 29c. For example, each reinforcing rib 29j can be a reinforcing rib that circumferentially extends slightly from each lateral surface of each engaging projection 29c (in this case, the reinforcing rib does not connect the circumferentially opposed lateral surfaces of each circumferentially adjacent pair of engaging projections 29c). Even with this arrangement, the deformation or damage of the engaging projections 29c is restrained.

In the above embodiment, the radially inner end of each reinforcing rib 29j extends to and is connected to the shaft portion 29b. However, the radially inner end of each reinforcing rib 29j can be modified to extend only to a radially middle portion of each engaging projection 29c. Even with this arrangement, the deformation or damage of the engaging projections 29c is restrained.

In the above embodiment, the radially outer end of each reinforcing rib 29j extends to and is connected to the radially outer ends of the adjacent engaging projections 29c. However, the radially outer end of each reinforcing rib 29j can be modified to extend only to the radially middle portion of each engaging projection 29c. Even with this arrangement, the deformation or damage of the engaging projections 29c is restrained.

In the above embodiment, the radially outer end of each reinforcing rib 29j circumferentially extends along the arc whose center coincides with the rotational axis of the shaft portion 29b. However, the radially outer end of each reinforcing rib 29j can have any other shape. For example, the radially outer end of each reinforcing rib 29j can extend along a straight line to connect the radially outer ends of the corresponding circumferentially adjacent pair of engaging projections 29c. Even with this arrangement, the deformation or damage of the engaging projections 29c is restrained.

In the above embodiment, the driven-side rotator 29 has the three engaging projections 29c. However, the number of the engaging projections 29c can be modified to any number. For example, the driven-side rotator 29 can be changed to a drive-side rotator having only two engaging projections 29c. In such a case, for example, the number of the protrusions 42 of the driving-side rotator 35 needs to be modified to correspond with the number of the engaging projections 29c. Even with this arrangement, it is possible to accomplish the advantages similar to those described in the above embodiment.

In the above embodiment, each reinforcing rib 29j is formed at the axial ends of the adjacent engaging projections 29c located on the worm shaft 28 side (i.e., the side opposite to the driving-side rotator 35). However, each reinforcing rib 29j can be formed at an axially middle portion of each engaging projection 29c. Even in this way, it is possible to accomplish the advantages similar to those described in the above sections (11) to (15). Even with this arrangement, the deformation or damage of the engaging projections 29c is restrained.

Additional advantages and modifications will readily occur to those skilled in the art. The invention in its broader terms is therefore, not limited to the specific details, representative apparatus, and illustrative examples shown and described.

What is claimed is:

1. A motor comprising:
   an oblate motor main body having a rotatable shaft;
   an output unit having a housing and a worm shaft, said housing being secured to said motor main body, said worm shaft being supported within said housing; and
   a clutch arranged between said rotatable shaft and said worm shaft, said clutch transmitting rotation of said rotatable shaft to said worm shaft and preventing transmission of rotation of said worm shaft to said rotatable shaft, said clutch including:
      a driving-side rotator arranged to rotate integrally with said rotatable shaft;
      a generally cylindrical collar secured to said housing;
      a driven-side rotator arranged to rotate integrally with said worm shaft, said driven-side rotator being located within said collar in a coaxial manner with respect to said driving-side rotator and having at least one control surface, each of said at least one control surface being spaced from said collar for a distance that varies in a circumferential direction of said collar, said driven-side rotator being drivingly engageable with said driving-side rotator in a rotational direction;
      at least one rolling element, each of said at least one rolling element being arranged between said collar and a corresponding one of said at least one control surface, said each of said at least one rolling element being rotated together with said driven-side rotator when said driving-side rotator is rotated, said each of said at least one rolling element being clamped between said collar and said corresponding one of said at least one control surface to restrain rotation of said driven-side rotator when said driven-side rotator is rotated;
      a support member rotatably supporting said at least one rolling element; and
      a stopper secured to said housing, said stopper restraining axial movement of said at least one rolling element by restraining axial movement of said support member to retain said at least one rolling element within said collar.

2. A motor according to claim 1, wherein said stopper is secured to one axial end of said housing, said one axial end of said housing being opposed to and secured to said motor main body, said stopper extending in a longitudinal direction of said axial end of said housing and having at least one securing portion provided in at least one of opposed longitudinal ends of said stopper, said at least one securing portion being secured to said one axial end of said housing.

3. A motor according to claim 1, wherein:
   said at least one rolling element is a plurality of rolling elements arranged at predetermined angular intervals;
   said at least one control surface is a plurality of control surfaces arranged at predetermined angular intervals; and
   said support member maintains said predetermined angular intervals of said rolling elements.

4. A motor according to claim 1, wherein:
   said support member includes an outward protrusion that protrudes radially outwardly beyond an inner peripheral surface of said collar at one axial end of said collar; and
   said stopper includes an engaging part that restrains said axial movement of said support member by axially abutting against said outward protrusion of said support member.

5. A motor according to claim 4, wherein:
   said outward protrusion of said support member is annular;
   said engaging part of said stopper is annular and has an inner diameter that is substantially the same as that of said outer protrusion of said support member;
   said stopper further includes at least one extended part that extends from said engaging part in said longitudinal direction of said one axial end of said housing; and
   said at least one securing portion of said stopper is provided in said at least one extended part of said stopper.

6. A motor according to claim 5, wherein:
   said collar includes at least one engaging portion that extends in said longitudinal direction of said one axial end of said housing and that engages with said housing in a circumferential direction; and
   said stopper further includes at least one restricting portion provided in at least one of said at least one extended part, each of said at least one restricting portion restricting axial movement of said collar by axially abutting against a corresponding one of said at least one engaging portion.

7. A motor according to claim 5, wherein said stopper is made of a plate material having a generally uniform thickness throughout it.

8. A motor according to claim 6, wherein:
   said stopper is made of a plate material having a generally uniform thickness throughout it; and
   each of said at least one restricting portion of said stopper is formed by cutting and bending a portion of a corresponding one of said at least one extended part of said stopper.

9. A motor according to claim 6, wherein:
   said stopper is made of a plate material having a generally uniform thickness throughout it; and
   each of said at least one restricting portion of said stopper is formed by bending a portion of a corresponding one of said at least one extended part of said stopper.

10. A motor according to claim 5, wherein each of said at least one securing portion of said stopper includes at least one resilient piece, each of said at least one resilient piece being formed by cutting and bending obliquely a portion of a corresponding one of said at least one extended part of said stopper such that said each of said at least one resilient piece axially immovably engages with a corresponding engaging projection provided in said housing.

11. A motor according to claim 1, wherein that said clutch is constructed such that said driven-side rotator, said collar, said support member with said at least one rolling element, and said stopper are installable in said housing before said motor main body is secured to said output unit.

12. A motor according to claim 2, wherein said housing includes a receiving space arranged adjacent to said stopper in such a manner that said receiving space extends in said longitudinal direction of said one axial end of said housing, said receiving space receiving a circuit element.

13. A motor according to claim 1, wherein:
   said driving-side rotator includes at least one protrusion, each of said at least one protrusion being arranged at a predetermined angular position within said collar and extending in an axial direction of said clutch; and
   said driven-side rotator includes a shaft portion, at least one engaging projection and at least one reinforcing rib, said shaft portion being arranged within said collar and being coaxial with said driving-side rotator, each of said at least one engaging projection being circumferentially engageable with at least one of said at least one protrusion, said each of said at least one engaging projection extending radially outwardly from said shaft portion and having a corresponding one of said at least one control surface at radially outer end surface thereof, said at least one reinforcing rib reinforcing said at least one engaging projection.

14. A motor according to claim 13, wherein:
   said at least one engaging projection is a plurality of engaging projections that are circumferentially spaced from each other;
   said at least one reinforcing rib is a plurality of reinforcing ribs that are circumferentially spaced from each other; and
   each of said reinforcing ribs is formed to connect circumferentially opposed lateral surfaces of each circumferentially adjacent pair of said engaging projections.

15. A motor according to claim 14, wherein a radially inner end of each of said reinforcing ribs extends to and is connected to said shaft portion.

16. A motor according to claim 14, wherein a radially outer end of said each of said reinforcing ribs extends to and is connected to radially outer ends of adjacent said engaging projections.

17. A motor according to claim 13, wherein said at least one reinforcing rib is formed at one axial end of each of said at least one engaging projection on an axial side opposite to said driving-side rotator.

* * * * *